(12) United States Patent
Chang et al.

(10) Patent No.: US 9,753,881 B2
(45) Date of Patent: Sep. 5, 2017

(54) FPGA BASED ATCA (ADVANCED TELECOMMUNICATIONS COMPUTING ARCHITECTURE) PLATFORM

(71) Applicant: NATIONAL INSTRUMENTS CORPORATION, Austin, TX (US)

(72) Inventors: Chen Chang, Fremont, CA (US); Kevin B. Camera, Walnut Creek, CA (US); John C. Wawrzynek, Berkeley, CA (US); Robert W. Brodersen, Berkeley, CA (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 635 days.

(21) Appl. No.: 14/213,476

(22) Filed: Mar. 14, 2014

(65) Prior Publication Data

US 2016/0275034 A1    Sep. 22, 2016

Related U.S. Application Data

(60) Provisional application No. 61/784,108, filed on Mar. 14, 2013.

(51) Int. Cl.
  *G06F 13/40* (2006.01)
  *G06F 13/38* (2006.01)

(52) U.S. Cl.
  CPC .............................. *G06F 13/4027* (2013.01)

(58) Field of Classification Search
  None
  See application file for complete search history.

(56) References Cited

U.S. PATENT DOCUMENTS

2012/0195558 A1* 8/2012 Ishii .................... G02B 6/4201
                                                       385/89
2012/0210416 A1* 8/2012 Mihelich ............ H04L 63/0218
                                                       726/11

* cited by examiner

*Primary Examiner* — Scott Sun
(74) *Attorney, Agent, or Firm* — Meyertons Hood Kivlin Kowert & Goetzel, P.C.; Jeffrey C. Hood

(57) ABSTRACT

A computing platform includes an array of interconnected field programmable gate arrays (FPGAs), memory, and external input/output interfaces. The platform is in the form of a blade conforming to the Advanced Telecommunications Computing Architecture (ATCA) standard. The platform is especially useful for telecommunications and networking applications.

9 Claims, 3 Drawing Sheets

FPGA BASED ATCA (ADVANCED TELECOMMUNICATIONS COMPUTING ARCHITECTURE) PLATFORM

CROSS-REFERENCE TO RELATED APPLICATION

This application claims priority to and the benefit of U.S. Provisional Patent Application No. 61/784,108, entitled "FPGA Based ATCA (Advanced Telecommunications Computing Architecture) Platform," filed on Mar. 14, 2013, the disclosure of which is hereby incorporated herein by reference in its entirety.

FIELD OF THE INVENTION

This invention, in various embodiments, generally relates to computing systems and, more particularly, to field programmable gate array (FPGA)-based systems for communications.

BACKGROUND

Hardware designers, particularly those working on blades or chassis, are currently faced with huge challenges. The needs of the communications network infrastructure, and next generation communications applications, are rapidly changing and cannot be served by existing solutions.

Field Programmable Gate Arrays (FPGAs): Hardware system designers are facing major challenges meeting the needs of evolving markets such as telecommunications and high-performance computing. Application performance and energy efficiency requirements are escalating, as is the need for flexible solutions that can adapt to evolving standards and market needs. Design complexity has soared, creating severe challenges in managing design and verification costs, time-to-market, and overall system performance and power consumption. Increasingly, hardware designers have turned to FPGAs instead of microprocessors or Application Specific Integrated Circuits (ASICs) to meet their design needs. Microprocessors, while fully programmable, can provide the required flexibility, and because a given product is customized through software, they address the time-to-market constraints. However, microprocessor solutions often fail to provide sufficient performance and energy efficiency to meet product requirements. ASICs, on the other hand, while capable of providing high performance and energy efficiency, are expensive to design (requiring many months or years) and therefore often fall short of time-to-market requirements and may be too expensive to develop.

FPGAs have evolved from simple logic fabrics used as glue logic concentrators to multi-million-gate programmable systems-on-a-chip used as ASIC and micro-processor replacements. They have been used in a wide variety of applications, from flexible network routing components, to high-performance general purpose computing devices, to special purpose signal processors. Driven by Moore's Law, ever-larger FPGAs are being used in a widening range of applications with ever-increasing functional requirements, and with the need for additional system-level resources (such as memory and input/output devices) and support for operating systems and integrated development environments. Meeting these requirements requires innovative ways to architect and package FPGA systems.

A common approach to addressing the engineering of FPGA-based platforms to meet the application functional requirements is to start with a conventional computer chassis and motherboard with expansion slots, and to add in a FPGA-equipped board and the appropriate set of boards for input/output. If additional resources are needed, multiple boxes can be connected together using any of the common networking methods, such as Ethernet or Infiniband. There are many deficiencies to this approach:

1. Because of internal bus limitations and limits on the number of expansion slots, in-box communication bandwidth is limited, creating bottlenecks between the FPGA(s), I/O, memory, and CPU(s).

2. Excessive delays between boxes (through switches and routers) limits performance scalability for larger systems.

3. As a result of re-purposing an existing system architecture instead of starting with a custom design tailored to application requirements, the system power efficiency and size are far from optimal.

4. There are no built-in provisions for efficient system management or high availability operation.

Advanced Telecommunications Computing Architecture (ATCA): ATCA specifications are a series of PCI Industrial Computer Manufacturers Group (PICMG) specifications which target the requirements for carrier grade communications equipment. The series of specifications incorporates high speed interconnect technologies, processors, and Reliability, Availability, and Serviceability (RAS). The Advanced Telecommunications Computing Architecture is the largest specification effort in the history of the PICMG, with more than 100 companies participating.

The ATCA standard ensures multi-vendor interoperability, offering flexibility in applications. With commitment from top silicon and software vendors, ATCA architectures are deployed worldwide by a wide range of industries that require a chassis-based high-performance computing platform including, for example, telecommunications, cloud services, military, and aerospace.

ATCA provides a means for the telecommunications equipment market to take advantage of standardized, off-the-shelf hardware. It was designed to enable differentiation through application-layer and system level software and offers the following advantages over traditional approaches: shorter time-to-market, increased vendor choice, increased flexibility, multiple supported switch fabrics, user defined I/O, and lower cost.

The architecture is optimized to meet the connectivity requirements of a variety of applications, and typically does so while providing a 99.9999% availability rate. ATCA offers a scalable backplane environment that supports: a variety of standard and proprietary fabric interfaces, robust system management, and superior power and cooling capabilities. Each board in ATCA (up to 16 boards per shelf and 3 shelves per rack) may support up to 200 Watts in a single slot. The power is supplied to each board via redundant −48 VDC feeds. Front and rear cabling is supported for standard 600 mm total depth cabinets, prevalent in Central Office facilities.

Examples of telecommunications and network equipment manufacturers' related ATCA applications and systems include:

1. Wireless Infrastructure Equipment: base stations and radio network controllers, serving gateway support node, gateway GPRS support node, home location register, IP multimedia subsystem servers, media and application servers, media gateways and soft switches.

2. Wireline Networking Equipment: DSLAMs, multi-service switches, media servers, blade servers, and VOIP session controllers.

3. Fiber Optic Networking Equipment.

While the ATCA specification is founded on the requirements of the communications infrastructure, it is extensible to a variety of applications and environments where highly available, highly scalable, cost effective, and open architecture modular solutions are required.

What is needed is a hardware platform that can combine the advantages of FPGAs with the ATCA form factor to address the challenges of telecommunications and network equipment hardware designers.

SUMMARY

Various embodiments of the present invention feature a computational platform whose system architecture can avoid the weaknesses of microprocessor based platforms and of ASIC solutions, while addressing the common deficiencies of FPGA-based computing platforms. Various embodiments described herein bring together Field Programmable Logic Devices (FPGAs) and the Advanced Telecommunications Computing Architecture (ATCA) standard, to address some of the challenges described above. The features of various embodiments include:

1. A main-board with multiple FPGAs in a two-dimensional array interconnected with high-bandwidth links.
2. Multiple memory chips connected to each FPGA.
3. Dedicated connectors for supporting industry-standard I/O.
4. Connectors for I/O expansion using industry-standard FMC (FPGA Mezzanine Card) boards.
5. An on-board connector for an industry-standard embedded CPU board, such as COM Express or equivalent.
6. All of the above in an industry-standard ATCA (Advanced Telecommunications Computing Architecture) form factor board (blade).

The ATCA form factor can address the system power and size issues, while providing a substrate for interconnecting boards efficiently using the mid-plane network fabric. Additional expansion using the ATCA-standard Rear Transition Module (RTM) is possible for connection between ATCA racks. Within the ATCA standard, each blade and system include controllers for system management and high availability operation.

Accordingly, in one aspect, a computing system that has a form factor of the Advanced Telecommunications Computing Architecture (ATCA) standard includes a number of FPGAs. The system also includes a first set of interconnects including at least one inter-FPGA interconnect that is electrically coupled to at least one pair of FPGAs in the several FPGAs. In addition, the system includes a second set of interconnects including at least one FPGA-fiber optic interconnect coupled to an FPGA.

In some embodiments, the first set of interconnects includes serdes interconnects. The system may also include an inter-module optical transceiver link coupled to at least one FPGA-fiber optic interconnect, e.g., for providing point-to-point communication with an FPGA that is included in a different system and is located remotely from the several FPGAs of this computing system.

In some embodiments, the several FPGAs include a first FPGA disposed on a board and a second FPGA also disposed on the same board. One inter-FPGA interconnect in the first set of interconnects is coupled to both the first and second FPGAs. The system may also include a third set of interconnects including a backplane interconnect. The backplane interconnect may be electrically coupled to the first FPGA, for providing connectivity to a backplane, which can then provide connectivity to another FPGA that is disposed on a different board.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

The present invention will become more apparent in view of the attached drawings and accompanying detailed description. The embodiments depicted therein are provided by way of example, not by way of limitation. Moreover, the drawings are not necessarily to scale, emphasis instead being placed upon illustrating aspects of the invention. In the drawings.

DESCRIPTION

Figure 1:
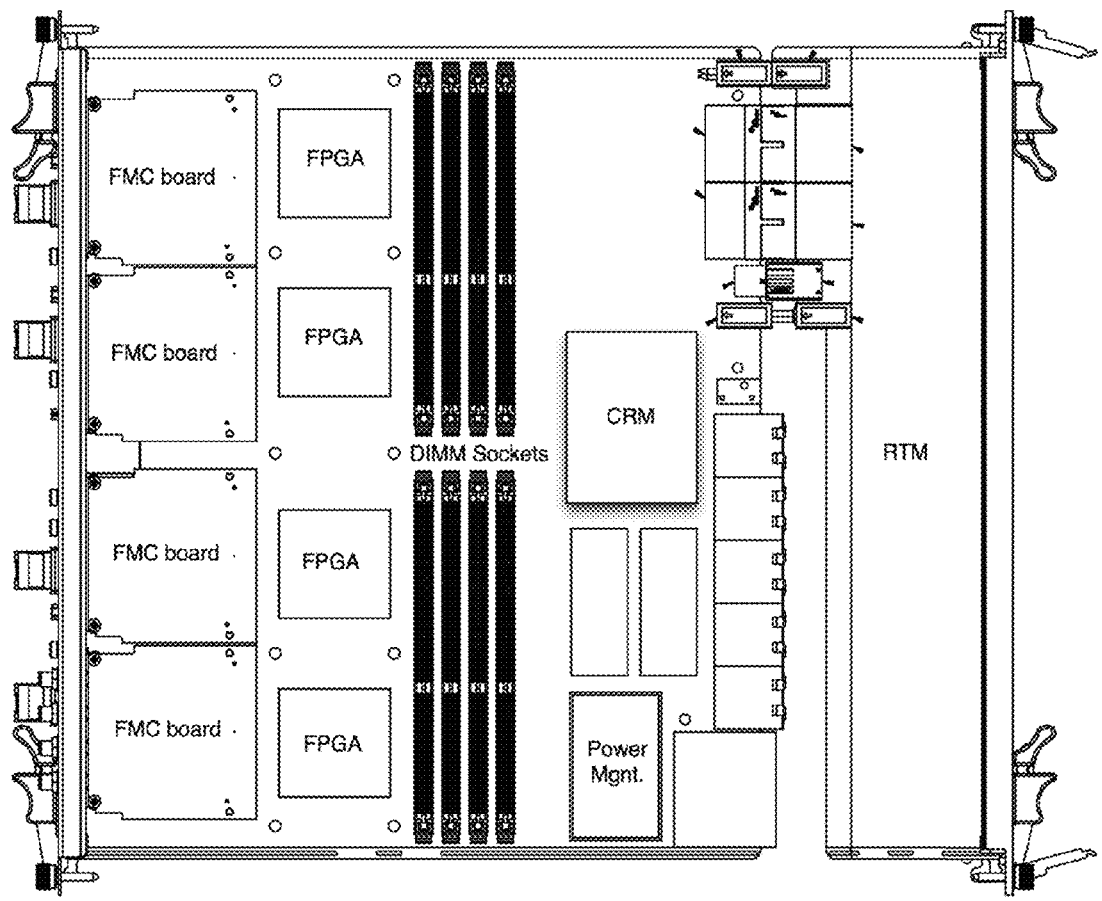
FIG. 1 depicts the main components of a system according to one embodiment of the invention.

One embodiment of the present invention is the BEE7 system. Referring to FIG. 1, BEE7 is an FPGA-based computing system in the form of a blade, including a printed circuit board that interconnects a set of integrated circuits and connectors. The BEE7 blade contains 4 Xilinx Virtex-7 FPGAs; 64 GB of DDR3-1333 ECC RDIMM DRAM arranged as two 8 GB RDIMMs per FPGA; a 10 Gbps Dual-star backplane arranged as 2 GTH serDes from each FPGA to the backplane (Sone 2 connector); 768 Gbps RTM (rear transfer module) throughput arranged as 16 GTH serDes from each FPGA to the RTM; 480 Gbps front panel optical connectors arranged as 12 GTH serDes from each FPGA to the iMOT connector; and 4 FMC front panel slots for analog interfaces arranged as 8 GTH SerDes from each FPGA to its dedicated FMC slot and 80 LVDS pairs from each FPGA to its dedicated FMC slot. The blade also contains a connector for a microprocessor based control module, labeled CRM in the figure.

Figure 2:
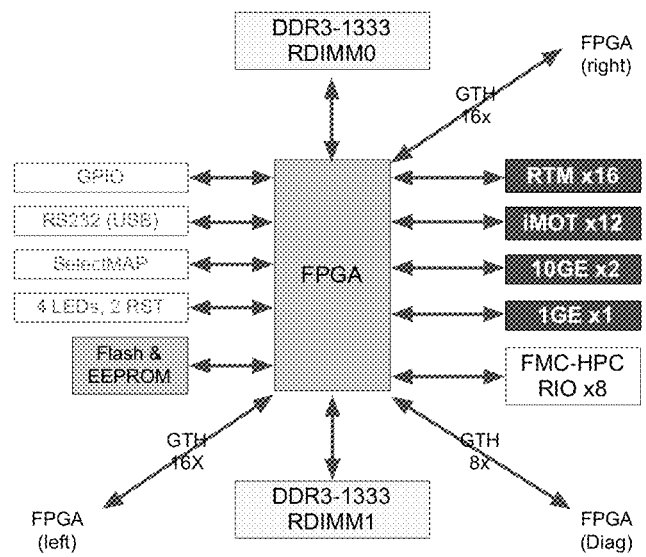
FIG. 2 is a schematic block diagram of an FPGA of a computing platform, according to one embodiment of the invention.

The BEE7 blade is based on a symmetric FPGA array architecture. Each FPGA presents the same connectivity to each other FPGA as well as to the PCB resources and input/output. Referring to FIG. 2, the main interfaces to the FPGA are 2 RDIMM banks, supporting DDR3 protocol with 2/4/8 GB capacity options, 1333 MHz speed, and Error Check and Correction (ECC); 400 Gbps on-board full mesh inter-FPGA connections; ATCA backplane (10GE) dual-star; 640 Gbps ATCA rear transfer module (RTM) flexible network expansion; 480 Gbps optical front panel (iMOT) inter-blade communication; FPGA Mezzanine Card (FMC) for analog interfaces; Gigabit Ethernet to the front and back panels; LVTTL GPIO to the front panel; RS232 (USB); SelectMAP (USB); EEPROM and Flash memory; and LEDs and reset.

Figure 3:
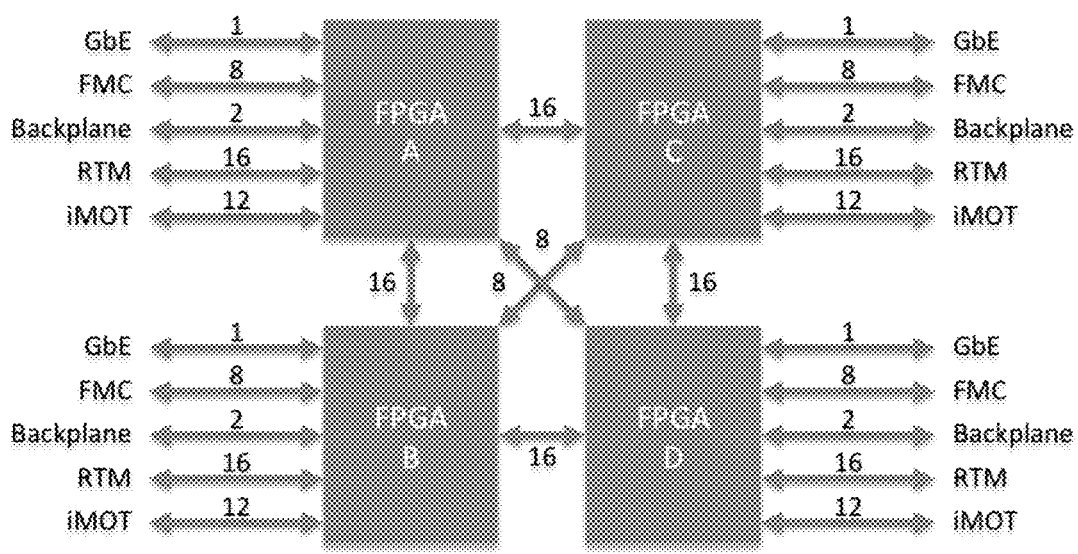
FIG. 3 is a schematic block diagram of the high-level architecture of the interconnections between FPGAs, according to one embodiment of the invention.

Referring to FIG. 3, the BEE7 blade is designed to take advantage of the 80 GTH SerDes available in each Virtex-7 VX690T FPGA to create a configuration that allows for high speed transfer of data between FPGA devices on the same board, between FPGA devices in different boards across the backplane, between FPGA devices in different boards or systems across front panel fiber optics (iMOT connectors), between FPGA devices and cards residing in FMC slots, and between FPGA devices and networking interfaces residing on the RTM.

The BEE7 blade is meant to be equipped in an ATCA chassis as needed by its application, for instance in a telecommunications service providers local exchange, in a cell tower, or in a data center. The BEE7 blade is a high performance platform that achieves a high degree of flexibility for Network I/O connectivity via Rear Transfer Module (RTM) Options. A variety of copper and fiber interfaces are supported by using different RTM cards.

Figure 4:
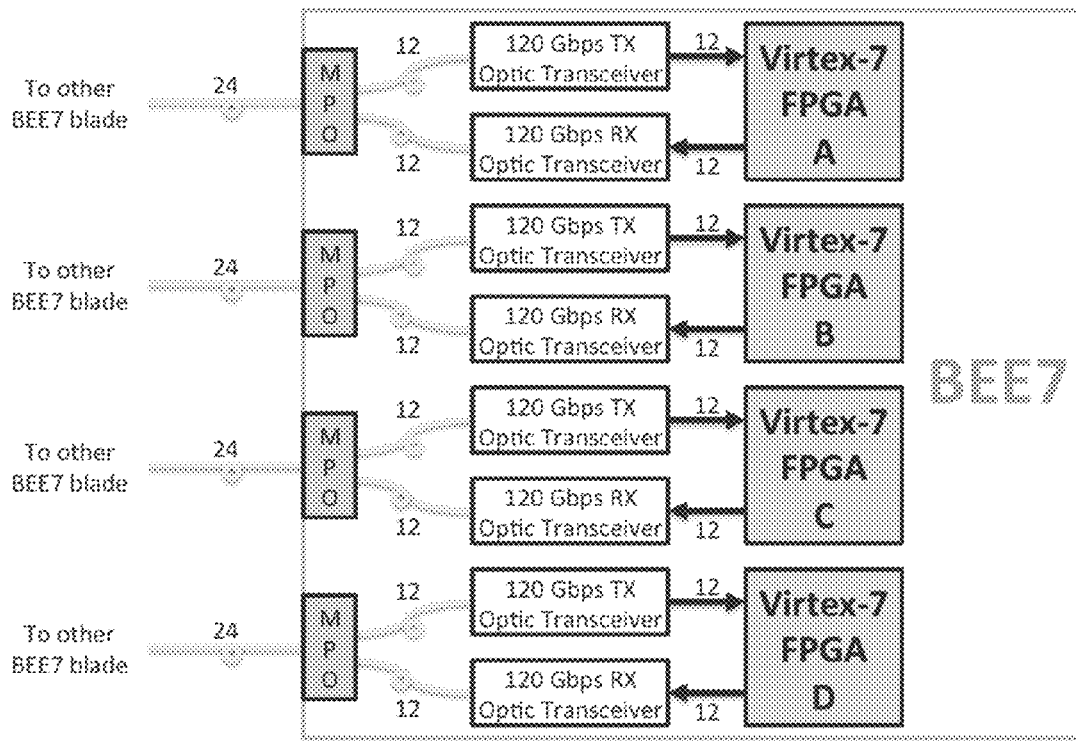
FIG. 4 depicts an example BEE7 connection via optical fibers in the front panel, according to one embodiment of the invention.

The Inter-Module Optical Transceiver (iMOT) is a high-throughput link intended to connect FPGAs in different BEE7 blades in a point-to-point manner. It consists of two transceivers, one for transmission (TX) and one for reception (RX), each supporting 120 Gbps over twelve fibers. The fibers are bundled in 24-fiber cables that connect to 24-fiber parallel optical sockets (MPO in the figure). The iMOT supports up to 100 meter MMF (Multi-Mode Fiber). FIG. 4 depicts the iMOT connections inside and outside the BEE7 for a total of 480 Gbps aggregated throughput.

Figure 5:
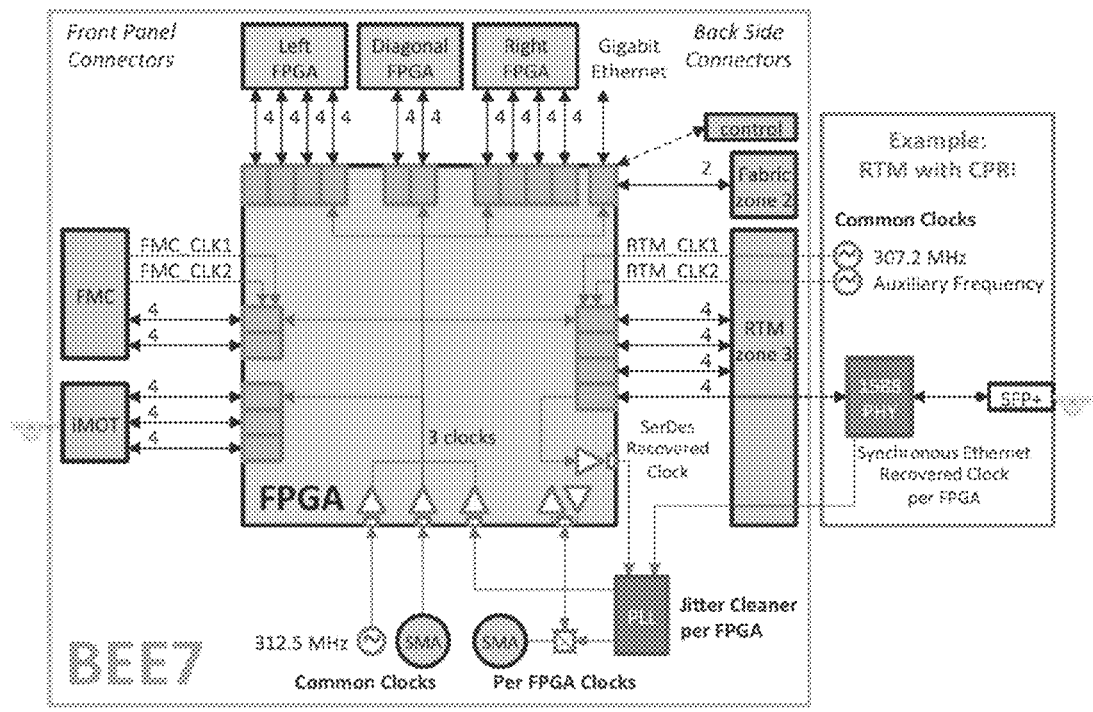
FIG. 5 depicts an example BEE7 SerDes and clock block diagram, according to one embodiment of the invention.

FIG. 5 shows in detail how the BEE7 blade and its FPGAs are clocked. The top of the block diagram shows the connection to the other FPGAs on the board as well as the Gigabit Ethernet connection. The left hand side shows the front panel (i.e. FMC and iMOT connectors). The right hand side shows the back panel (i.e. zone 2 and zone 3 connectors). A CPRI-based RTM is also shown in this side. Finally, the bottom of the block diagram shows clock inputs on SMA connectors and the PLL.

The BEE7 blade is a high performance platform that achieves a very high degree of flexibility for a wide range of applications through support for FMC cards. For example, it supports radio I/O connectivity for wireless applications through the use of ADC and DAC cards.

The BEE7 is the first off-the-shelf platform for telecommunications that allows suppliers to keep the same fully programmable hardware across the product life cycle. BEE7 can be used for early algorithm exploration, research, development, real time verification, prototyping, field trials, limited deployment, and product upgrades.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed:

1. A computing system comprising a first board conforming to a form factor of the Advanced Telecommunications Computing Architecture (ATCA) standard, the first board comprising:
    a first local field programmable gate array (FPGA) based computing node;
    a second local FPGA based computing node, wherein the first and second local FPGA based computing nodes are configured to perform direct point-to-point communications with one another via a dedicated link, wherein the dedicated link is shared exclusively between the first FPGA based computing node and the second FPGA based computing node; and
    an optical communication link configured for providing selectable point-to-point communication between the first local FPGA based node and a remote FPGA based node on a second board of another, different computing system, wherein the second board also conforms to the form factor of the ATCA standard, wherein the optical communications link includes a first optical transceiver directly coupled to the first local FPGA based node, wherein no other FPGA based node on the first board is coupled to the first optical transceiver.

2. The system of claim 1, wherein the optical communication link comprises an inter module optical transceiver (iMOT) connector.

3. The system of claim 2, wherein the iMOT connector comprises:
    the first optical transceiver and a second optical transceiver, the second optical transceiver being directly coupled to the second local FPGA based node, wherein no other FPGA based node on the first board is coupled to the second optical transceiver and
    a plurality of optical sockets, wherein each optical socket is coupled to a respective optical fiber.

4. The system of claim 3, wherein:
    the plurality of sockets comprises 24 sockets, each coupled to a respective one of 24 optical fibers;
    a first set of 12 sockets from the plurality of sockets and a corresponding first group of 12 optical fibers is coupled to the first transceiver; and
    a second set of 12 sockets from the plurality of sockets and a corresponding second group of 12 optical fibers is coupled to the second transceiver.

5. The system of claim 3, wherein the first transceiver comprises a transceiver supporting a communication speed of at least 120 Gbps.

6. The system of claim 3, wherein at least one of the respective optical fibers comprises a multi-mode fiber up to 100 meters in length.

7. A method comprising:
    conducting point-to-point communications over a dedicated link coupled between a first local field programmable gate array (FPGA) based computing node and a second local FPGA based computing node implemented on a first board conforming to a form factor of the Advanced Telecommunications Computing Architecture (ATCA) standard, wherein the dedicated link is shared exclusively between the first FPGA based computing node and the second FPGA based computing node; and
    conducting point-to-point communications over an optical communication link between the first local FPGA based node and a remote PGA based node on a second board of another, different computing system, wherein the second board also conforms to the form factor of the ATCA standard, wherein the optical communications link includes an optical transceiver directly coupled to the first local FPGA based node and is not coupled to any other FPGA based node on the first board.

8. The method as recited in claim 7, wherein conducting point-to-point communications over the optical communications link comprises conducting communications through an inter module optical transceiver (iMOT) connector.

9. The system of claim 1, wherein the first FPGA based computing node includes separate and unique interfaces to a plurality of other FPGA based computing nodes, including the second FPGA based computing node, implemented on the first board.

* * * * *